Nov. 23, 1926.

L. G. SRESOVICH ET AL 1,608,441

SEPTIC TANK

Original Filed Jan. 14, 1924    3 Sheets-Sheet 1

WITNESSES
M. Fowler
J. P. Schrott

INVENTOR
L. G. Sresovich AND
C. F. R. Coates
BY
Munn & Co.

ATTORNEYS

Nov. 23, 1926.

L. G. SRESOVICH ET AL 1,608,441

SEPTIC TANK

Original Filed Jan. 14, 1924    3 Sheets-Sheet 2

WITNESSES
M. Fowler
J. P. Schrott

INVENTOR
L. G. Sresovich
AND C. F. R. Coates
BY Munn & Co.
ATTORNEYS.

Nov. 23, 1926.
L. G. SRESOVICH ET AL
1,608,441
SEPTIC TANK
Original Filed Jan. 14, 1924   3 Sheets-Sheet 3
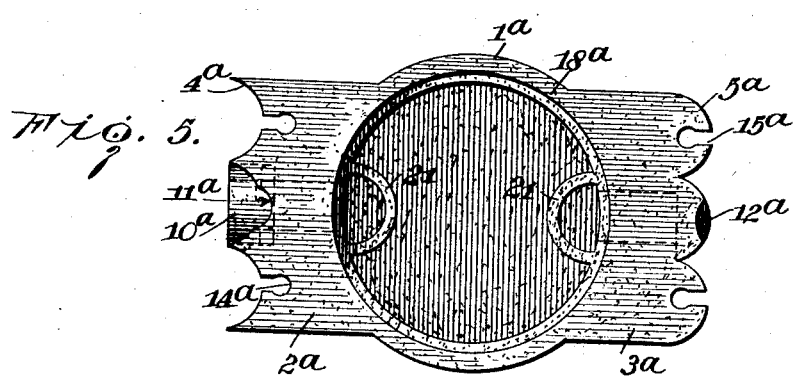
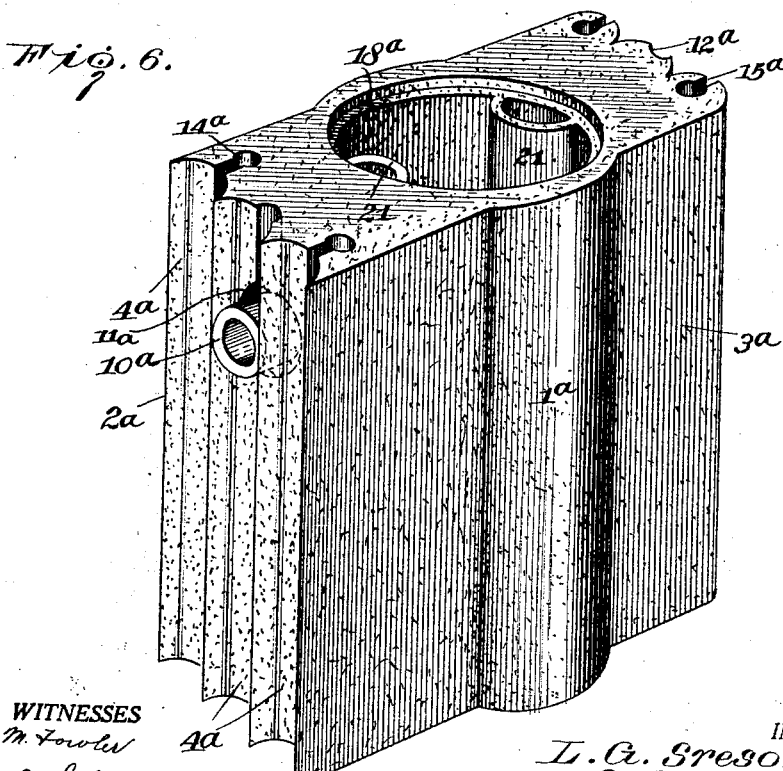

Patented Nov. 23, 1926.

1,608,441

UNITED STATES PATENT OFFICE.

LUKE GEORGE SRESOVICH AND CHARLES FREDERICK RANDAL COATES, OF MIAMI, FLORIDA, ASSIGNORS TO INTERLOX TANK COMPANY, A CORPORATION.

SEPTIC TANK.

Application filed January 14, 1924, Serial No. 686,198. Renewed September 10, 1926.

Our invention relates to improvements in septic tanks and it consists of the constructions, combinations and arrangements herein described and claimed.

An object of the invention is to provide a septic tank which may be used either singly or in a combination of tanks for the purpose of receiving and storing sewage, particular use of the invention being made in communities where no sewerage system is available.

Another object of the invention is to provide a septic tank which has such an arrangement of key grooves to be filled with cement or other plastic material when two or more of the tanks are used in combination, to thereby hold the tanks together so that there may be no relative settling and consequent leakage from the joints.

Another object of the invention is to provide a septic tank having lateral enlargements which are respectively provided with concavities and convexities adapted to fit similar formations on other tanks when a number of tanks are used in combination.

Figure 1:
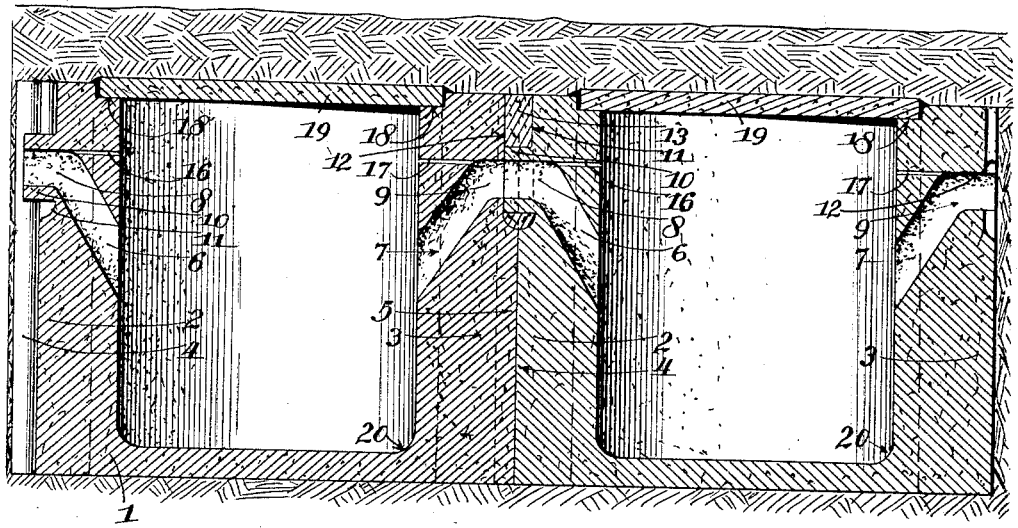
Figure 2:
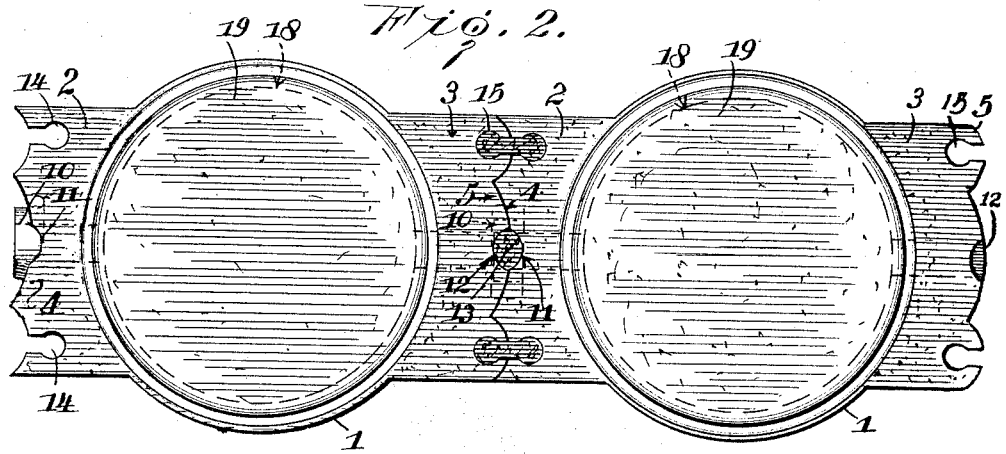
Figure 3:
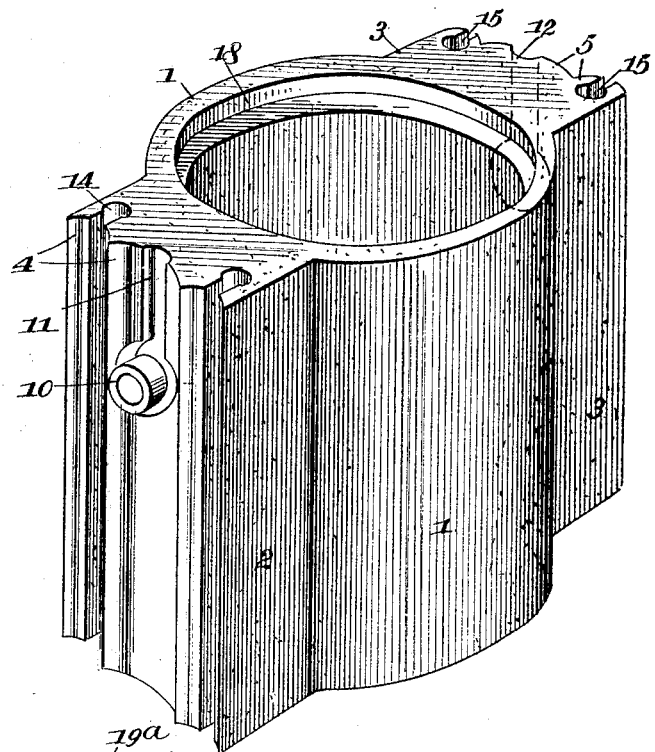
Figure 4:
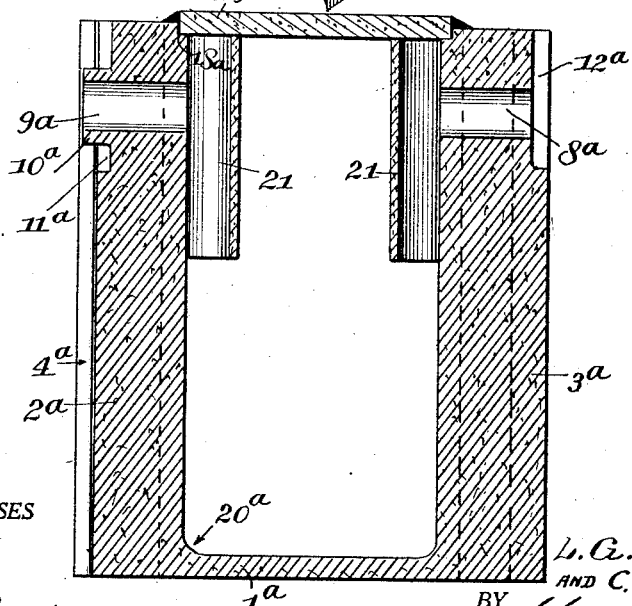

Other objects and advantages will appear from the following specification, reference being had to the accompanying drawings, in which, Figure 1 is a longitudinal section showing two of the improved septic tanks fixed in combination, Figure 2 is a plan view, Figure 3 is a detail perspective view of the septic tank, Figure 4 is a vertical section of a septic tank illustrating a modification in the form of baffles, Figure 5 is a plan view of the parts shown in Figure 4, Figure 6 is a perspective view of the tank in Figures 4 and 5.

As may be gathered from the foregoing brief statement of the objects of the invention, the septic tank is used primarily in communities where the facilities of a sewerage system are not available. The scope of use of the septic tank is not limited to connection with small dwellings because by properly designing the tanks and setting them in combinations or batteries, large hotels, apartment houses, industrial plants, et cetera, may be accommodated.

Reference is first made to Figure 3 which shows one of the tanks in detail. The tank 1 is made of any suitable material, concrete being one of the popular materials in that it readily lends itself to casting. Lateral enlargements or lugs 2 and 3 provide foundations upon the respective ones of which concavities 4 and convexities 5 respectively are formed.

These concavities and convexities are inter-engageable when two or more of the septic tanks are set together in combination as shown in Figure 1. The concavities and convexities are shown arranged in series of three extending crosswise of the enlargements. Obviously more of each may be employed should it be found necessary or desirable.

Formed in the enlargements 2 and 3 are passages 6 and 7 (Figure 1) which communicate with the interior of the tanks at a place approximately midway of its height, and extend upward at a decided angle after which they merge with inlet and outlet openings 8 and 9 respectively. These openings originate in the central concavity 4 and convexity 5 respectively. The inlet opening 8 extends through a collar 10 which is either cast as an integral part of the enlargement 2, or may be set in as a separate part. This collar is surrounded by a groove 11 which extends upward to the top of the enlargement 2. A similar groove 12 in the complementary enlargement 3 of a tank next adjacent (when two or more tanks are used in combination) is intended to receive the collar 10 as clearly shown in Figure 1.

Cement or other material 13 is poured into the chamber formed by the complementary grooves 11 and 12 which, upon hardening, forms an adequate bond at the joint around the collar 10. The respective enlargements 2 and 3 have key grooves 14 and 15 which, like the grooves 11 and 12, are intended to register when two or more tanks are placed together, so that cement or other plastic material may be poured in as in the instance already cited. This cement upon hardening provides a key or bond which not only holds the tanks close together but also prevents one from settling in respect to the other. All of the various grooves, passages, et cetera, occur in the enlargements 2 and 3 which supply the necessary strength and rigidity required.

Attention is directed to Figure 1. One or the other of the two tanks may be regarded as the receiving or sludge tank. The sewage is discharged into this tank, say for example, the tank 1 at the left, which, upon gradual filling, will ultimately discharge some of its contents into the adjacent tank through the communicating passages 7 and 6. As already stated, these passages are inclined at a decided angle. The intervening wall presented by the enlargements 2 and 3 constitute an invisible baffle, which prevents an undesirable splashing of the contents of the first tank into the second.

Arranged immediately above each of the passages 6 and 7 and on a level with the tops of the openings 8 and 9 are vent openings 16 and 17. These are for the purpose of permitting a circulation of gas from one tank to the other. The top of each tank is countersunk at 18, so that a cover 19 may be normally seated upon the tank to prevent the entrance of dirt and to make it air tight when the tank is buried.

It is to be further observed that the corners of the tank are rounded at 20. This gives each shell or tank a bowl-shaped bottom, preventing the collection and clogging of solid material in corners.

The modification in Figures 4, 5 and 6 differs from the foregoing form of the invention principally in the arrangement of the baffles. In this instance the baffles are cast interiorly of the tank 1ª in the shape of upstanding culverts 21 which normally are open at both ends (Figure 4). The lower ends of these baffles end approximately midway of the height of the tank. The upper ends are closed by the cover 19ª when the latter is in place. This cover is seated in the circular groove 18ª at the top and if desired the joint between the cover and the tank may be sealed with a suitable material in both forms of the invention. The culverts or baffles are in direct line with enlargements (like the enlargements 2 and 3) on the exterior of the tank.

Openings 8ª and 9ª communicate with the passages formed by the baffles 21. The opening 8ª passes through a collar 10ª which, like the collar 10 in Figure 1, is situated in a vertical groove 11ª, in turn formed in one of several concavities 4ª. The outermost concavities have key grooves 14ª which are adapted to receive a sealing medium when two or more tanks are set together.

The opposite side of the tank 1ª has an enlargement 3ª, like the enlargement 2ª, provided with convexities 5ª. The central convexity has a groove 12ª, and the outermost convexities have key grooves 15ª. The object of all these is undoubtedly fully apparent and the description thereof will not have to be repeated. The tank 1ª, as in Figure 1, has fully rounded corners 20ª at the bottom so that no material may find lodgement.

There are several outstanding features of importance in the improved septic tank; 1, the convex and concave abutments of the lateral enlargements 2 and 3 by means of which adequate and tight connection between tanks may be made; 2, the male and female connections 10 and 12 (Figure 1); 3, the bowl shape of the bottom 20, and, 4, the countersunk top 18 which provides a seat for the cover 19. Another feature of advantage lies in the fact that the septic tanks are made in solid units, thereby permitting any inexperienced person to fully install a perfect sanitary sewerage disposal system.

While the construction and arrangement of the improved septic tank herein described and claimed is that of a generally preferred form, obviously modifications and changes may be made without departing from the spirit of the invention or the scope of the claims.

We claim:—

1. A septic tank having diametric reinforcing enlargements respectively provided with concavities and convexities on abuttable surfaces, certain ones of the convexities and concavities having key grooves others having plain grooves, and a collar extending from one of the plain grooves said collar and the complementary groove on the opposite side having openings extending to the interior of the tank.

2. A septic tank having diametric external enlargements arranged to be abutted when two or more tanks are fitted together, the abutting surfaces of said enlargements having a plurality of concavities and convexities running lengthwise thereof, the central ones of each having grooves extending part of the length and others of each having full length key grooves, and a collar extending from one of the central grooves to fit into the complementary groove of another tank when placed thereagainst, said collar and complementary groove providing a male and female connection between tanks and having openings extending to the interior of the tanks.

3. A septic tank having diametric external enlargements arranged to be abutted when two or more tanks are fitted together, the abutting surfaces of said enlargements having a plurality of concavities and convexities running lengthwise thereof, the central ones of each having grooves extending part of the length and others of each having full length key grooves, a collar extending from one of the central grooves to fit into the complementary groove of another tank when placed thereagainst, said collar and complementary groove providing a male and female connection between tanks and having openings extending to the interior of the tanks, and means including passages in said enlargements with which said openings merge on the interior of the tanks defining walls acting as baffles in respect to fluid entering said passages.

4. A septic tank having axially alining inlet and outlet openings incorporated in the walls thereof each merging with passages extending in different directions but toward the bottom of the tank the inclined confronting walls of said passages defining a baffle arrangement, the bottom corner of the interior of the tank being fully rounded into a bowl-shape to prevent the accumulation of substance discharged from said baffles.

5. A septic tank having diametric, axially alining inlet and outlet openings disposed substantially horizontally and merging with downwardly inclined passages discharging toward the bottom of the tank the inclined confronting walls of said passages providing baffles, and a collar built at the mouth of one of said openings being adapted to fit in a depression at the mouth of the opening of a complementary tank when two or more tanks are set together.

6. A unitary septic tank having an internally countersunk top, a pair of lateral external enlargements extending full length of the tank the respective enlargements having a series of full length concavities and convexities along the abuttable surfaces the outermost ones of each having full length key grooves, the central one of each having a shallow groove with which inwardly directed openings and passages in said enlargements communicate, a collar situated in one of said grooves through which one of the openings passes, and a cover for the tank to occupy the countersunk top.

7. A septic tank having diametrically opposite relatively thick external abuttable enlargements, there being axially alined inlet and outlet openings merging with acutely downwardly inclined passages in each of said thick enlargements, those portions of said enlargements in front of the passages constituting baffles, the roof of each opening having merging therewith an inwardly directed vent passage which is situated in each of said baffles.

8. Apparatus of the character described comprising a plurality of chambers, each having specially prepared abuttable surfaces provided with vertically disposed registering grooves, a plastic bond filling the grooves thereby preventing lateral displacement of the chambers with respect to each other, means protruding from each of the abuttable surfaces entering the abuttable surface of a complementary chamber, and a plastic bond filled in around said last means both to seal the joints and prevent axial displacement of the chambers.

9. Apparatus of the character described comprising a plurality of chambers, each having abuttable surfaces provided with vertically disposed registering grooves, a plastic bond filling the grooves to prevent lateral displacement of the chambers, hollow means protruding from one surface of each chamber entering an aperture in the complementary surface of a companion chamber to form part of a passage furnishing communication between said chambers, both said hollow means and said aperture having a surrounding groove communicating with the top of the chamber, and a plastic bond filling said last grooves both to seal the joints and prevent axial displacement of the chambers.

10. Apparatus of the character described comprising a plurality of chambers having relatively thin walls, means furnishing communication between the chambers, and relatively heavy abutments formed on the outside of the wall of each chamber, the abuttable surfaces of said abutments being so shaped that complementary abutments will interengage, such interengagement alone preventing lateral displacement of the chambers and said means of communication when connected in series.

11. Apparatus of the character described comprising a plurality of chambers each having relatively thin walls, means furnishing communication between the chambers, a plurality of relatively heavy and thick abutments on the outside of the wall of each chamber, the abuttable surfaces of said abutments having such shape, including scallops, which when interengaged upon connecting a plurality of the chambers in series will alone prevent lateral displacement and disruption of said means of communication, said abutments having registerable grooves enlarging toward the interior to provide keys, and a plastic material filling said grooves to constitute a bond and augment the aforesaid provision against lateral displacement.

12. A septic tank unit including a bottom and an annular wall integral with the bottom and forming a tank complete in itself and provided at opposite sides with connecting elements, the connecting element at either side being constructed to abut against and be fastened to a connecting element of a similar unit, and a port in each connecting element arranged to form a passageway with the port of a similar unit when two of such units are placed in abutting relation with either connecting element of one of the units secured to either connecting elements of the other unit.

13. A septic tank unit formed of molded material and including a substantially tubular body portion having a closed bottom provided with a substantially semi-spherical inner surface, lugs provided upon opposite sides of said body portion, said lugs having substantially vertical and substantially horizontal key-ways adapted to receive grouting employed in connecting a plurality of said units together, inlet and outlet ports extending through said lugs, and a pipe provided upon one of said lugs and adapted to project into one of the ports of a similar unit.

14. A septic tank unit including a bottom and an annular wall integral with the bottom and forming a tank complete in itself and provided at one side with a convex surface and at its opposite side with a concaved surface formed to nest within the convexed surface of a similar unit, and key-ways in said surfaces extending in diverse directions.

15. A septic tank unit including a body provided with a lug having a convexed surface, a second lug upon the body having a concaved surface adapted to snugly engage the convexed surface of a lug on a similar tank body, and substantially vertical and substantially horizontal parallel key-ways in said surfaces for receiving grouting running in one direction along said lugs, and another form of key-way in said surfaces running in a direction other than that of the first key-ways.

16. A septic tank unit including a bottom and an integral annular wall, said wall being provided at one side with a projecting lug having key-ways merging into its outer surface, a second lug projecting outwardly from the opposite side of the wall being provided with key-ways merging with the surface, aligned ports extending through opposite sides of the wall through said lugs, said key-ways surrounding the ports to permit sealing the ports when lugs of two similar units are placed together and grouting is inserted in the key ways.

LUKE GEORGE SRESOVICH.
CHARLES FREDERICK RANDAL COATES.